United States Patent
Gauba et al.

(10) Patent No.: US 8,818,403 B1
(45) Date of Patent: Aug. 26, 2014

(54) ADJUSTING WIRELESS COVERAGE AREA RESOURCE ASSIGNMENT BASED ON DEVICE ALTITUDE

(75) Inventors: Maneesh Gauba, Overland Park, KS (US); Sachin R. Vargantwar, Overland Park, KS (US); Maulik K. Shah, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 376 days.

(21) Appl. No.: 13/372,852

(22) Filed: Feb. 14, 2012

(51) Int. Cl.
*H04W 24/00* (2009.01)

(52) U.S. Cl.
USPC ............ 455/456.1; 455/418; 455/435.2; 455/456.5; 455/456.6; 455/11.1

(58) Field of Classification Search
CPC .............................. H04Q 64/00; H04Q 4/02
USPC ............ 455/456.1, 456.5, 456.6, 418, 435.2, 455/11.1
See application file for complete search history.

(56) References Cited

U.S. PATENT DOCUMENTS

| | | | |
|---|---|---|---|
| 6,208,857 B1 | 3/2001 | Agre et al. | |
| 6,631,262 B1 | 10/2003 | Wee | |
| 6,845,246 B1 | 1/2005 | Steer | |
| 6,999,780 B1 * | 2/2006 | Zhao | 455/456.5 |
| 7,065,361 B1 | 6/2006 | Fortuna | |
| 7,245,908 B1 * | 7/2007 | Weaver et al. | 455/430 |
| 7,260,415 B1 | 8/2007 | Oh | |
| 7,620,364 B2 * | 11/2009 | Higashida et al. | 455/11.1 |
| 7,640,025 B2 * | 12/2009 | Zhao | 455/456.1 |
| 7,689,240 B2 | 3/2010 | Anderson | |
| 7,853,269 B2 | 12/2010 | van de Groenendaal | |
| 7,920,860 B2 | 4/2011 | Chari et al. | |
| 8,005,510 B2 | 8/2011 | Fischer | |
| 2004/0203824 A1 | 10/2004 | Mock et al. | |
| 2005/0147062 A1 | 7/2005 | Khouaja et al. | |
| 2005/0176406 A1 | 8/2005 | Krishnakumar et al. | |
| 2005/0213527 A1 | 9/2005 | Xie | |
| 2006/0040660 A1 | 2/2006 | Cruz et al. | |
| 2007/0087752 A1 | 4/2007 | Voyer et al. | |
| 2007/0155421 A1 | 7/2007 | Alberth et al. | |
| 2007/0218823 A1 | 9/2007 | Wolf | |
| 2007/0275734 A1 | 11/2007 | Gaal et al. | |
| 2010/0105373 A1 | 4/2010 | Kanade | |
| 2010/0113021 A1 | 5/2010 | Vare et al. | |
| 2010/0182900 A1 | 7/2010 | Sung et al. | |
| 2012/0184318 A1 | 7/2012 | Lee et al. | |

OTHER PUBLICATIONS

First Action Interview Pilot Program Pre-Interview Communication, mailed Jul. 30, 2013, 4 pages.
Notice of Allowance and Applicant-Initiated Interview Summary for U.S. Appl. No. 13/372,838 mailed Sep. 12, 2013, 14 pages.

* cited by examiner

*Primary Examiner* — Sanh Phu

(57) ABSTRACT

In order to provide better wireless service to wireless communication devices (WCDs) at different altitudes (e.g., on different levels of a high-rise structure), a radio access network (RAN) may include antennas that are configured to provide coverage at these different altitudes. The RAN may assign resources, such as transmit power or frequencies, to wireless coverage areas serving particular altitude ranges in a proportion that is commensurate with the number of WCDs being served by these particular altitude ranges. As a result, RAN and WCD performance may improve.

20 Claims, 6 Drawing Sheets ly, WCD 102 may communicate over an
ADJUSTING WIRELESS COVERAGE AREA RESOURCE ASSIGNMENT BASED ON DEVICE ALTITUDE

BACKGROUND

In urban and some suburban environments, the presence of multi-story and high-rise buildings makes the deployment of wireless coverage more challenging. In conventional wireless networks, the antennas that radiate to define wireless coverage areas are arranged to provide wireless coverage at ground level. As a result, wireless communication devices (WCDs) on the upper floors of structures may experience poor wireless service. Wireless network providers have attempted to address this problem by aiming some antennas at an angle so that a portion of wireless coverage is provided to WCDs above ground level.

OVERVIEW

Equipped with one or more antennas that provide wireless coverage to various altitudes, a radio access network (RAN) may use a frequency or a set of frequencies to define a split wireless coverage area. The split wireless coverage area may include a first sub-area providing wireless coverage to WCDs above a threshold altitude and a second sub-area providing wireless coverage to WCDs below the threshold altitude. Alternatively or additionally, the RAN may use some frequencies to define one or more wireless coverage area that provide wireless coverage to WCDs above the threshold altitude and other frequencies to define one or more wireless coverage areas that provide wireless coverage to WCDs below the threshold altitude.

The altitude of a WCD may be determined in various ways. For example, the WCD may include a global positioning system (GPS) receiver, and the WCD may be able to obtain its altitude via GPS, and then report this altitude to the RAN. Based on the reported altitude, and possibly other factors, such as the strengths at which the WCD receives signals from nearby wireless coverage areas, the RAN may attempt to balance the allocation of wireless resources (e.g., power and/or frequencies) between the WCDs at higher altitudes and the WCDs at lower altitudes. RAN and WCD performance may benefit from an assignment of wireless resources to wireless coverage areas above and below the threshold altitude that is roughly commensurate with the proportion of WCDs above and below the threshold altitude.

Accordingly, in an example embodiment, a RAN may radiate to define a split wireless coverage area, wherein the split wireless coverage area comprises a first sub-area serving a first set of WCDs that are above a threshold altitude and a second sub-area serving a second set of WCDs that are below the threshold altitude. The RAN may use a first transmit power to define the first sub-area and a second transmit power to define the second sub-area. A first count of WCDs in the first set may be determined, and a second count of WCDs in the second set may also be determined. Then, the RAN may adjust at least one of the first transmit power and the second transmit power to attain a selected ratio of the first transmit power to the second transmit power. The selected ratio may be related to a ratio of the first count of WCDs to the second count of WCDs.

In another example embodiment, a RAN may radiate on a first set of frequencies to define a first set of wireless coverage areas and radiate on a second set of frequencies to define a second set of wireless coverage areas. The first set of wireless coverage areas may serve a first set of WCDs that are above a threshold altitude, and the second set of wireless coverage areas may serve a second set of WCDs that are below the threshold altitude. A first count of WCDs in the first set of WCDs and a second count of WCDs in the second set of WCDs may be determined. A third count of frequencies in the first set of frequencies and a fourth count of frequencies in the second set of frequencies may also be determined. A comparison may be made between a first ratio of the first count of WCDs to the second count of WCDs, and a second ratio of the third count of frequencies to the fourth count of frequencies. Based on the comparison of the first ratio to the second ratio, one or more particular frequencies defined by the RAN may be assigned to one of the first set and the second set.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Example Network Architecture

Figure 1:
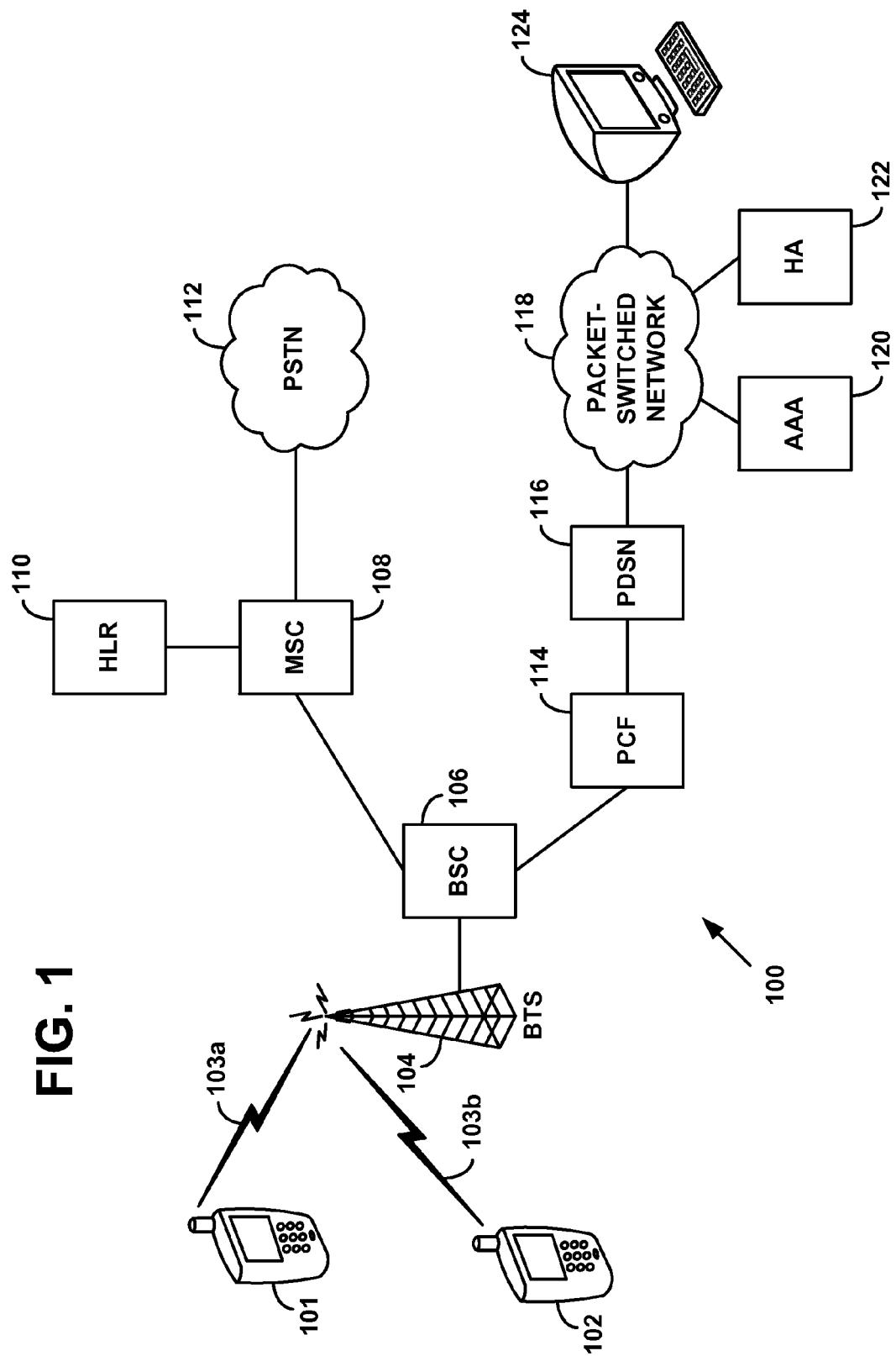
FIG. 1 depicts a RAN configured to provide wireless services to WCDs, in accordance with an example embodiment.

FIG. 1 is a simplified block diagram of a wireless communication system 100 in which example embodiments can be employed. WCD 101 may communicate over an air interface 103a with a base transceiver station (BTS) 104, which is, in turn, coupled to or integrated with a base station controller (BSC) 106. Similarly, WCD 102 may communicate over an air interface 103b with BTS 104. Transmissions over air interface 103a from BTS 104 to WCD 101 and over air interface 103b from BTS 104 to WCD 102 may take place on "forward links" to the WCDs. Conversely, transmissions over air interface 103a from WCD 101 to BTS 104 and over air interface 103b from WCD 102 to BTS 104 may take place on "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. In practice, a BSC may serve multiple BTSs, each of which may define one or more wireless coverage areas.

As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, may provide connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103*a*, WCD 101 may transmit a request to PDSN 116 for a connection to the packet data network. Then, following authentication of WCD 101 by AAA server 120, WCD 101 may be assigned an IP address by PDSN 116 or by HA 122, and may thereafter engage in packet-data communications with entities such as remote computer 124. Similar procedures may take place for WCD 102, via air interface 103*b*.

BTS 104, BSC 106, MSC 108, HLR 110, PCF 114, and PDSN 116 may be considered to be RAN components. Thus, these components, and any network(s) and/or links connecting these components to one another, may be referred to as a RAN. However, a RAN may contain more or fewer components.

Further, the description of the elements in FIG. 1 is merely illustrative and should not be interpreted to limit the characteristics and functions of these devices. Accordingly, it should be understood that this and other arrangements and processes described herein are set forth for purposes of example only. Thus, other arrangements and elements (e.g., machines, interfaces, functions, orders of elements, etc.) can be added or used instead and some elements may be omitted altogether. Further, as in most communication architectures, those skilled in the art will appreciate that many of the elements described herein are functional entities that may be implemented as discrete components or in conjunction with other components, in any suitable combination or location.

II. Example Computing Device

Figure 2:
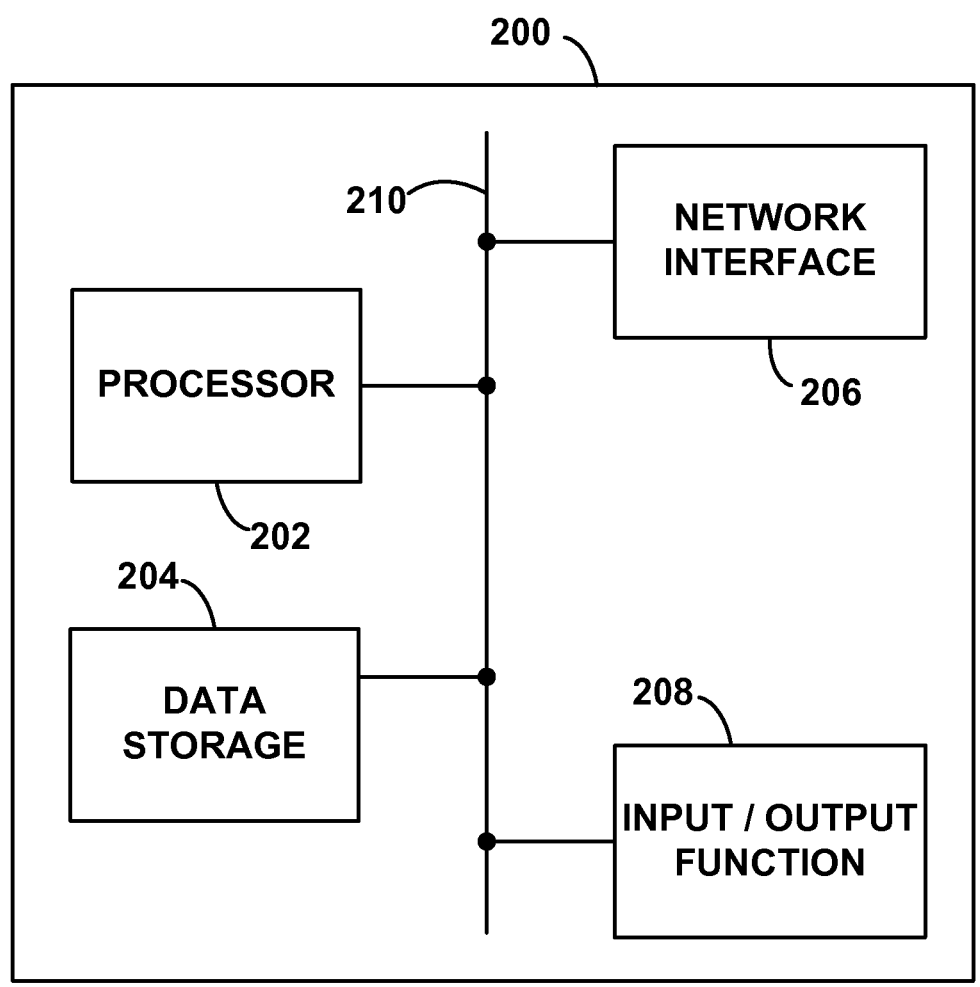
FIG. 2 is a high-level diagram of a computing device, in accordance with an example embodiment.

FIG. 2 is a simplified block diagram exemplifying a computing device 200. This computing device illustrates one or more of the functional elements that may be found in a device arranged to operate in accordance with the embodiments described herein. Thus, computing device 200 may represent the hardware and/or software architecture of any one or more of BTS 104, BSC 106, MSC 108, and so on. Further, computing device 200 may represent the hardware and/or software architecture of a device not shown in FIG. 1 that instructs or controls various elements of wireless communication system 100.

Computing device 200 may include a processor 202, data storage 204, network interface 206, and input/output function 208, all of which may be coupled by a system bus 210 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may include a tangible, non-transitory computer-readable medium, having stored thereon program instructions that, upon execution by one or more processors, cause computing device 200 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as Wifi, BLUETOOTH®, or a wide-area wireless connection. However, other forms of physical layer connections and other types of standard or proprietary communication protocols may be used over network interface 206. Furthermore, network interface 206 may comprise multiple physical communication interfaces.

Input/output function 208 may facilitate user interaction with example computing device 200. Input/output function 208 may comprise multiple types of input devices, such as a keyboard, a mouse, a touch screen, a microphone and/or any other device that is capable of receiving input from a user. Similarly, input/output function 208 may comprise multiple types of output devices, such as a display, printer, one or more light emitting diodes (LEDs), speaker, or any other device that is capable of providing output discernible to a user. Additionally or alternatively, example computing device 200 may support remote access from another device, via network interface 206 or via another interface (not shown), such an RS-232 or Universal Serial Bus (USB) port.

III. CDMA Communications

The embodiments herein will be described by way of example with reference to Code Division Multiple Access (CDMA) communications. However, it should be understood that these embodiments can employ other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a particular Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be assigned dynamically to WCDs for use as traffic channels.

In order to acquire the signals of a wireless coverage area, a WCD may be configured by its home wireless service provider with a preferred roaming list (PRL) of frequencies to scan when the WCD is seeking service. The frequencies in the PRL may be arranged in a listed order, and the WCD may be arranged to scan the frequencies in the order listed in the PRL, starting with the first-listed frequency. If the WCD cannot receive a signal on the first-listed frequency at sufficient signal strength, the WCD may then scan the next frequency in the PRL. This process may continue until the WCD discovers that it can receive a frequency with a sufficiently strong signal, or the WCD reaches the end of the PRL.

Once a WCD acquires a wireless coverage area on a particular frequency, the WCD may then receive information about the configuration of the wireless coverage area from one or more of the wireless coverage area's pilot channel, sync channel, and paging channel. Upon acquiring the wireless coverage area, the WCD may be considered to be "idle," in that the WCD is not exchanging bearer data with a BTS. Such an idle WCD may listen to the paging channel of the primary wireless coverage area for incoming call indications, and other information, from the RAN. The RAN may transmit system parameter messages and/or neighbor list messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs). An idle WCD may measure the pilot channel signal strength that it receives from each of these neighboring wireless coverage areas.

If, for some period of time, WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD engages in a voice or data call, the WCD may use the primary wireless coverage area's paging channel and access channel to establish the call. For example, when an idle WCD originates a new outgoing call (i.e., the WCD is the caller), the WCD may transmit one or more access probe (or origination) messages to the RAN via the access channel of the primary wireless coverage area. Each access probe message may contain an identification of the WCD seeking to establish the call, as well as information specific to the nature of the request, such as the type of call or session being sought, among other possible details.

The RAN may respond to an access probe message by assigning one or more traffic channels from one or more wireless coverage areas to the WCD. To that end, the RAN may transmit, via the paging channel, an indication of the channel assignment (e.g., by identifying frequencies, PN offsets, and/or Walsh codes of the assigned traffic channels). This transmission may take the form of one or more channel assignment messages directed to the WCD. Then, the now-active WCD (i.e., the WCD is no longer "idle") may use the assigned traffic channels for transmitting and/or receiving bearer data for the voice or data call.

A WCD may communicate via a number of "active" wireless coverage areas at the same time. Depending on the type and/or configuration of the RAN, the number of active wireless coverage areas may be from one to six. However, more than six active wireless coverage areas may be used without departing from the scope of the embodiments herein. The WCD may maintain a list of the active wireless coverage areas, which may be identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS.

Regularly, or from time to time, the WCD may measure the signal-to-noise ratio (SNR) of a channel (e.g., a pilot channel) from each of these wireless coverage areas, to determine the respective received signal strengths of each wireless coverage area. When the WCD determines that the received signal strength of its serving wireless coverage area has dropped below a signal-strength threshold, or the received signal strength of another wireless coverage area in the active set exceeds that of the serving wireless coverage area by some amount, the WCD may request a handoff from the serving wireless coverage area to a wireless coverage area from which the WCD has received a higher signal strength. Additionally, the WCD may add or remove wireless coverage areas from the active set based on these signal strengths or for other reasons.

IV. Serving WCDs at a Range of Altitudes

Conventional wireless communication networks are designed to serve WCDs at ground level, in that the antennas that radiate to define wireless coverage areas are typically configured to provide most or all of their coverage at the ground level. However, in urban and even some suburban environments, WCDs may be at various altitudes. For instance, a WCD in a skyscraper may be 1,000 feet or more above the ground. As a result, this WCD may experience poor wireless coverage, or no wireless coverage at all.

In order to address this problem, some BTSs may contain, or be associated with, one or more antennas that provide wireless coverage at higher altitudes. In possible embodiments, these antennas may be tilted, angled, or otherwise configured, to provide wireless coverage directed to the higher floors of nearby structures.

A. Example Antenna Configurations

Figure 3A:
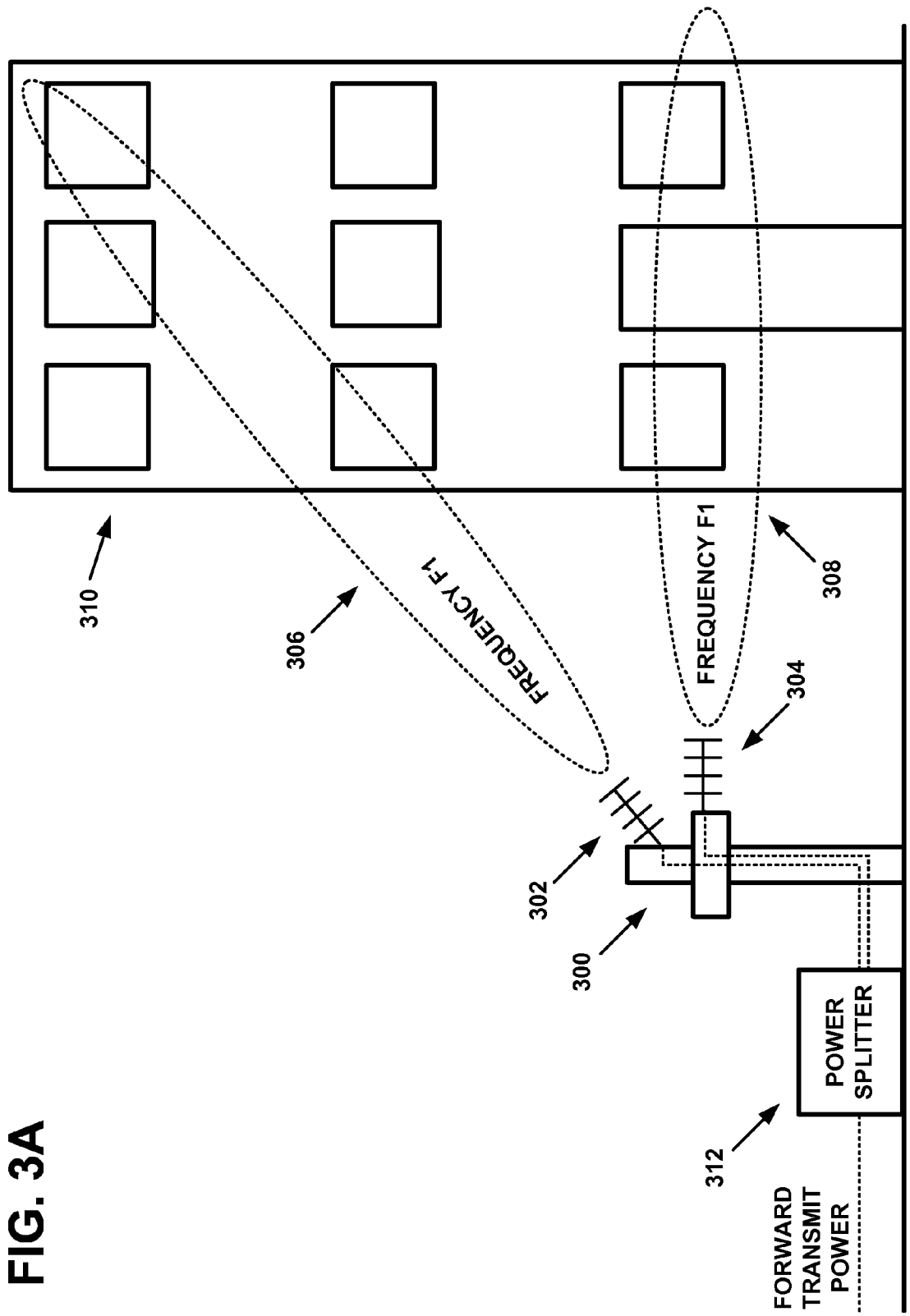
FIG. 3A illustrates a multi-level wireless coverage configuration, in accordance with an example embodiment.

FIG. 3A illustrates such a configuration. BTS 300 may include antennas 302 and 304. Antenna 302 may radiate to define wireless coverage area 306, and also may be configured to aim this coverage toward the higher floors of multi-story structure 310. Antenna 304 may radiate to define wireless coverage area 308, and also may be configured to aim this coverage toward the lower floors of multi-story structure 310.

As shown in FIG. 3A, the antennas may define both wireless coverage area 306 and wireless coverage area 308 using the same frequency, frequency F1. However, a fixed amount of power may be available to define these wireless coverage areas. Thus, the forward transmit power used by antenna 302 and antenna 304 may be divided by power splitter 312. For example, 70% of the forward transmit power may be used to define wireless coverage area 308 and 30% of the forward transmit power may be used to define wireless coverage area 306. In another example configuration, 50% of the forward transmit power may be used to define wireless coverage area 308 and 50% of the forward transmit power may be used to define wireless coverage area 306.

Other distributions of forward transmit power between the wireless coverage areas may be possible. In some embodiments, wireless coverage areas formed in this fashion may be referred to as "sub-areas" of the same split wireless coverage area.

Figure 3B:
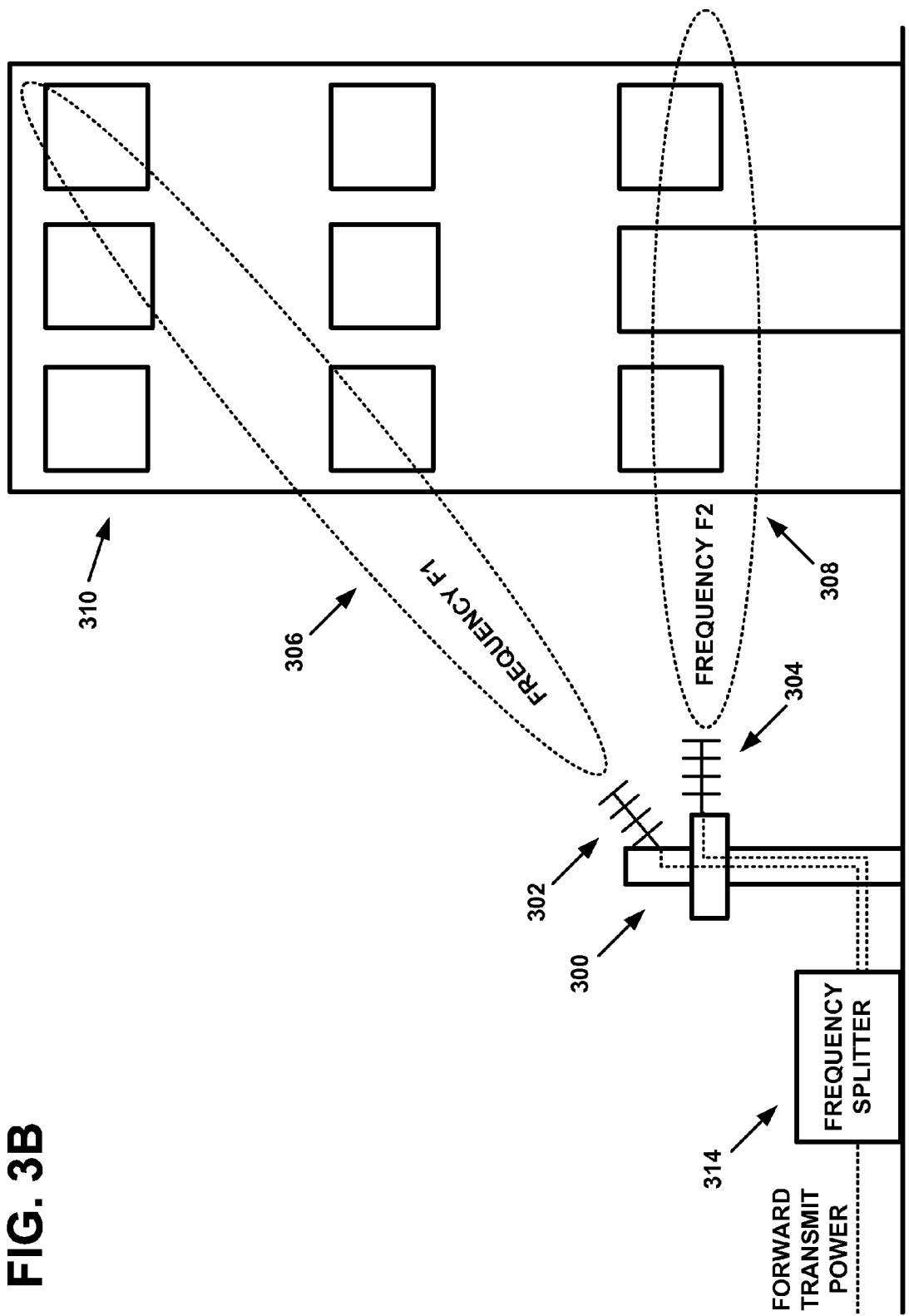
FIG. 3B illustrates another multi-level wireless coverage configuration, in accordance with an example embodiment.

FIG. 3B illustrates an alternate embodiment in which antenna 302 radiates on frequency F1 to define wireless coverage area 306 and antenna 304 radiates on frequency F2 to define wireless coverage area 308. Thus, in this embodiment, some frequencies may serve WCDs at higher altitudes while other frequencies may serve WCDs at lower altitudes. Also, power splitter 312 is replaced by frequency splitter 314. Frequency splitter 314 may contain, for instance, one or more filters that direct specific frequency ranges to particular antennas.

In this embodiment, the wireless coverage areas may be defined using the same or a similar amount of power. In further embodiments, a single BTS may include both a power splitter and a frequency splitter, and therefore may provide multi-level wireless coverage on the same frequencies, but at different powers, while also providing wireless coverage to each level using different frequencies at each level.

In FIGS. 3A and 3B, the size and shape of antennas 302 and 304 are exaggerated for purposes of illustration. In practical deployments, antennas may take on various shapes, sizes, and arrangements.

More generally, the entire BTS, antenna, and wireless coverage configurations illustrated by FIGS. 3A and 3B are examples. Other configurations are included within the scope of this disclosure. For instance, some configurations may include multiple BTSs, and each BTS may include more than two antennas. Thus, each BTS may define more than two wireless coverage areas. For instance, one BTS may include antennas such that the BTS defines multiple wireless coverage areas that serve WCDs on the higher floors of multi-story structure 310, and multiple wireless coverage areas that serve WCDs on the lower floors of multi-story structure 310.

Alternatively or additionally, a BTS may include several antennas that each serve WCDs on a specific range of floors of multi-story structure 310. For instance, multi-story structure 310 may include more than just the three floors illustrated in FIGS. 3A and 3B. Therefore, one antenna may be aimed to provide wireless coverage to floors one through five, another antenna may be aimed to provide wireless coverage to floors six through ten, and yet another antenna may be aimed to provide wireless coverage to floors eleven through fifteen, and so on. Moreover, power splitter 312 and/or frequency splitter 314 may be part of BTS 300 (e.g., mounted on BTS 300) rather than a separate component.

The various wireless coverage areas defined by BTS 300 may overlap to some extent. Thus, a WCD in multi-story structure 310 may be able to be served by either or both of these wireless coverage areas. For instance, a WCD served by wireless coverage area 306 may be able to receive signals from wireless coverage area 308, and vice versa.

It should be clear from the preceding discussion that the multi-level wireless coverage contemplated by FIGS. 3A and 3B could be used to serve WCDs in an urban environment, a suburban environment, and/or any other environment in which WCDs may be at various altitudes. In the following, for purposes of simplicity, it will be assumed that in example embodiments only two levels of wireless coverage are provided: one for WCDs above a threshold altitude and another for WCDs below the threshold altitude. Nonetheless, any embodiments described herein may be generalized to support multiple levels of wireless coverage at various altitudes.

B. Determining WCD Altitude

One potential aspect of the embodiments described herein involves determining a WCD's altitude, and performing various functions, methods, and/or procedures based on this determined altitude. For example, if a WCD is above a threshold altitude, and therefore better served by wireless coverage areas serving higher altitudes, the RAN and/or the WCD may behave in a particular fashion. However, if the WCD is below the threshold altitude, and therefore better served by wireless coverage areas serving lower altitudes, the RAN and/or the WCD may behave in a different fashion.

Various techniques may be employed to determine a WCD's altitude. In some embodiments, a WCD may be equipped with a GPS receiver. Thus, the WCD may be able to obtain its altitude via GPS, and the WCD may report this altitude to the RAN. In other embodiments, the WCD may be equipped with an accelerometer, a gyroscope, and/or an altimeter, and the WCD may be able to obtain or infer its altitude from measurements performed by one or more of these components. In yet other embodiments, the WCD's altitude may be determined based on the wireless coverage areas from which the WCD receives signals at or above a threshold signal strength.

Particularly, and as noted above, a WCD may measure the signal strength that it receives from various wireless coverage areas (e.g., the pilot signal strengths of these wireless coverage areas). Wireless signals received by WCDs at higher altitudes may be subject to less interference, attenuation, and/or distortion than wireless signals received by WCDs at lower altitudes. For example, a WCD at or near the top of a tall building may be able to receive signals from distant BTSs, at least in part because there is less likely to be physical barriers between those BTSs and the WCD. On the other hand, a WCD at or near ground level in an urban or suburban area may be partially or fully surrounded by buildings, walls, or other structures that could obstruct wireless signals from the BTSs. As result, a WCD's altitude may be able to be determined based on the strength at which the WCD receives signals from distant BTSs.

For purposes of example, Table 1 provides a hypothetical configuration of wireless coverage areas at various distances from a BTS serving WCD 1 and WCD 2. WCD 1 is at an altitude of 500 feet, while WCD 2 is at an altitude of 3 feet. Thus, WCD 2 is essentially at ground-floor level. Wireless coverage area PN1 is defined 0.7 miles from the BTS, and its signals are received at a strength of −6 dB by WCD 1 and −4 dB by WCD 2, respectively. Wireless coverage area PN2 is defined 1.5 miles from the BTS, and its signals are received at a strength of −8 dB by WCD 1 and −8 dB by WCD 2, respectively. Wireless coverage area PN3 is defined 4.0 miles from the BTS, and its signals are received at a strength of −12 dB by WCD 1 and −14 dB by WCD 2, respectively. Wireless coverage area PN4 is defined 5.2 miles from the BTS, and its signals are received at a strength of −13 dB by WCD 1. WCD 2 receives signals from wireless coverage area PN4 at a negligible strength or not at all. Thus, WCD 1, which is at a relatively high altitude, can receive signals from the more distant wireless coverage areas at a greater signal strength than WCD 2.

TABLE 1

| Wireless Coverage Area | Distance from BTS | Received Signal Strength at WCD 1 (altitude of 500 feet) | Received Signal Strength at WCD 2 (altitude of 3 feet) |
|---|---|---|---|
| PN1 | 0.7 miles | −6 dB | −4 dB |
| PN2 | 1.5 miles | −8 dB | −8 dB |
| PN3 | 4.0 miles | −12 dB | −14 dB |
| PN4 | 5.2 miles | −13 dB | N/A |

In some embodiments, the RAN may define a threshold distance from the BTS, beyond which a wireless coverage area is deemed to be "distant." For instance, this threshold distance for the hypothetical configuration of Table 1 may be 3.5 miles. Thus, wireless coverage areas PN1 and PN2 would not be considered distant, while wireless coverage areas PN3 and PN4 would be considered distant. Given this example threshold distance, and the associated grouping of wireless coverage area PN1 with wireless coverage area PN2, and wireless coverage area PN3 with wireless coverage area PN4, the RAN may classify WCD 1 as "high altitude," because WCD 1 can receive signals from both wireless coverage areas PN3 and PN4. Conversely, the RAN may classify WCD 2 as "low altitude" because WCD 2 cannot receive signals from wireless coverage area PN4.

More generally, the altitude of a WCD may be determined based on the WCD reporting that it has received signals above a threshold strength from at least n of the distant wireless coverage areas. Suppose that, for the hypothetical configuration of Table 1, the threshold strength is −13.5 dB and n is two. Then the RAN may classify WCD 1 as "high altitude," because WCD 1 receives signals above a strength of −13.5 dB from distant wireless coverage areas PN3 and PN4. However, the RAN may classify WCD 2 as "low altitude," because WCD 2 does not receive signals above a strength of −13.5 dB from at least two distant wireless coverage areas.

While the discussion above refers to a RAN determining WCD altitude, another device that is not a RAN component may determine WCD altitude instead. For instance, WCDs might directly or indirectly transmit their reports of measured signal strength to one or more server devices, and these server devices may determine each WCD's respective altitude. The server devices may also transmit the determined altitudes to the RAN, or instruct the RAN to carry out particular functions based on the determined altitudes.

Additionally, while just two different classifications of WCD altitude ("high altitude" and "low altitude," respectively) were discussed in this section, the methods, processes, and functions described herein may be generalized to support more than two classifications of WCD altitude. For example, the RAN (or a separate server device) may classify WCD altitude into several overlapping or non-overlapping altitude ranges.

Furthermore, in addition to GPS, accelerometer, gyroscope, altimeter, and/or signal strength measurements, other ways of determining WCD altitude may also be possible.

V. Wireless Coverage Area Resource Assignment Based on Device Altitude

One possible way in which WCD and/or RAN performance and service quality might be improved is for the RAN to assign wireless coverage area resources based on device altitude. For instance, the RAN may assign resources to one or more wireless coverage areas (or sub-areas of split wireless coverage areas) based on the number of WCDs in the altitude range served by those wireless coverage areas. In some embodiments, the RAN may seek to assign resources to wireless coverage areas or sub-areas in a proportion that is commensurate with the number of WCDs at the altitude served by those wireless coverage areas or sub-areas.

For example, in the scenario depicted by FIG. 3A, a wireless coverage area is split into sub-areas 306 and 308, which respectively serve WCDs above and below a threshold altitude. One possible resource that the RAN may assign to these sub-areas based on WCD altitude is transmit power. As noted above, by adjusting power splitter 312, the RAN may be able to control the ratio of transmit power used to define sub-areas 306 and 308.

The RAN may attempt to adjust the transmit power assigned to sub-areas 306 and 308 to be approximately proportional to the number of WCDs above and below the threshold altitude, respectively. For instance if 25 WCDs are above the threshold altitude and 25 WCDs are below the threshold altitude, the RAN may use 50% of the transmit power available to the split wireless coverage area to define sub-area 306, and the other 50% to define sub-area 308.

Therefore, from time to time, the RAN may determine counts of the number of WCDs above and below the threshold altitude, respectively. The RAN may make this determination periodically (e.g., every n seconds, minutes, or hours). Alternatively or additionally, the RAN may make this determination aperiodically (e.g., randomly).

Based on the determination, the RAN may derive a "WCD ratio"—the ratio of the number of WCDs above the threshold altitude to the number of WCDs below the threshold altitude. For example, if 10 WCDs are above the threshold altitude and 40 WCDs are below the threshold altitude, the WCD ratio may be 1:4, or 1/4. Then, the RAN may set a "power ratio"— the ratio of transmit powers used to define sub-areas 306 and 308, respectively, to be commensurate with that of the WCD ratio. Continuing the example, the RAN may set the transmit power ratio to also be 1:4 (i.e., 20% of the power is used to define sub-area 306 and 80% of the transmit power is used to define sub-area 308).

In some situations, the RAN may be configured so that no less than a certain percentage of the transmit power will be used to define either of the sub-areas. Thus, for example, if this percentage is 10% and all WCDs are below the threshold altitude, the RAN may still use 10% of the power to define sub-area 306. An advantage of supporting such a minimum transmit power per sub-area is that WCDs moving from below the threshold altitude to above the threshold altitude will be served by a sufficient amount of transmit power. It should be noted that the minimum transmit power per sub-area may be specified with an absolute value (e.g., a number of Watts) instead of a percentage.

The RAN may also be configured to limit the maximum power adjustment that can be made over a particular period of time. For instance, the RAN may prevent the percentage of transmit power used to define a sub-area from changing by more than 20% in any 10-second period. Thus, continuing the example from above, suppose that the power ratio power ratio is 1:4, or 4 (i.e., 20% of the transmit power is used to define sub-area 306 and 80% of the transmit power is used to define sub-area 308). If the RAN determines that 40 WCDs are above the threshold altitude and 10 WCDs are below the threshold altitude, normally the RAN would set the power ratio to be 4:1 (i.e., 80% of the transmit power is used to define sub-area 306 and 20% of the transmit power is used to define sub-area 308). However, given the RAN's limit on maximum power adjustment, the RAN may instead set the power ratio to 2:3 (i.e., 40% of the transmit power is used to define sub-area 306 and 60% of the transmit power is used to define sub-area 308). In this way, the transmit power that the RAN uses to define any particular sub-area changes on a more controlled basis, and avoids rapid fluctuations.

In the scenario depicted by FIG. 3B, wireless coverage areas 306 and 308 are defined using different frequencies, and respectively serve WCDs above and below a threshold altitude. However, in general, each wireless coverage area may be defined using multiple frequencies (e.g., one or more frequency bands). Herein, the term "frequency" may refer to a single frequency, multiple frequencies, or a band of frequencies that are used to define a wireless coverage area.

Also, more than one wireless coverage area may serve WCDs above the threshold altitude and more than one wireless coverage area may serve WCDs below the threshold altitude. Thus, one possible resource that the RAN may assign, based on WCD altitude, is frequencies.

As discussed in reference to the scenario of FIG. 3A, from time to time, the RAN may determine counts of the number of WCD above and below the threshold altitude. Based on the determination, the RAN may derive a "WCD ratio" of the number of WCDs above the threshold altitude to the number of WCDs below the threshold altitude. The RAN may also, from time to time, determine a "frequency ratio" of the number of frequencies serving WCDs above the threshold altitude to the number of frequencies or serving WCDs below the threshold altitude.

The RAN may attempt to set the frequency ratio to be approximately proportional to the WCD ratio. For instance if 25 WCDs are above the threshold altitude and 25 WCDs are below the threshold altitude, the RAN may attempt to assign 50% of the available frequencies to serve WCDs above the threshold altitude, and the other 50% to serve WCDs below the threshold altitude. The assignment of frequencies to altitudes may be implemented by setting the configuration of frequency splitter 314.

It may not always be possible for the frequency ratio to be equivalent to the WCD ratio. Thus, the RAN may compare the WCD ratio to the frequency ratio. In some embodiments, if the WCD ratio is greater than the frequency ratio, the RAN may assign one or more particular frequencies to serve WCDs above the threshold altitude. However, if the WCD ratio is less than or equal to the frequency ratio, the RAN may assign one or more particular frequencies to serve WCDs below the threshold altitude.

In some situations, a frequency being assigned may be presently unassigned. In other situations, the frequency may be already in use. Thus, assigning the frequency may involve removing the frequency from serving WCDs below the threshold altitude and assigning the frequency to serve WCDs above the threshold altitude. Alternatively, assigning the frequency may involve removing the frequency from serving WCDs above the threshold altitude and assigning the frequency to serve WCDs below the threshold altitude.

For instance, suppose that 20 WCDs are above the threshold altitude and 30 WCDs are below the threshold altitude, for a WCD ratio of 2:3, or 2/3. If 3 frequencies are serving WCDs above the threshold altitude and 2 frequencies are serving WCDs below the threshold altitude, the frequency ratio is 3:2, or 3/2. Here, the WCD ratio is less than the frequency ratio, so the RAN may assign one of the frequencies serving WCDs above the threshold altitude to serve WCDs below the threshold altitude.

Additionally, when the RAN assigns a frequency that is already in use, the RAN may be configured to assign the frequency that is least used of all candidate frequencies. Thus, in the previous example, 3 frequencies are serving WCDs above the threshold altitude. The RAN may select one of these frequencies that is serving the least number of active and/or idle WCDs. In this way, disruptions to WCDs being served by this frequency are mitigated.

Moreover, the RAN may also support one or more of the additional features discussed in context of the scenario of FIG. 3A. Thus, in some embodiments, the RAN may be configured so that no less than a certain percentage or number of frequencies will be used to serve WCDs above the threshold altitude, and no less than the certain percentage or number of frequencies will be used to serve WCDs below the threshold altitude. Further, the RAN may also be configured to limit the maximum percentage or number of frequencies that can be assigned during a particular period of time.

VI. Example Methods

Figure 4:
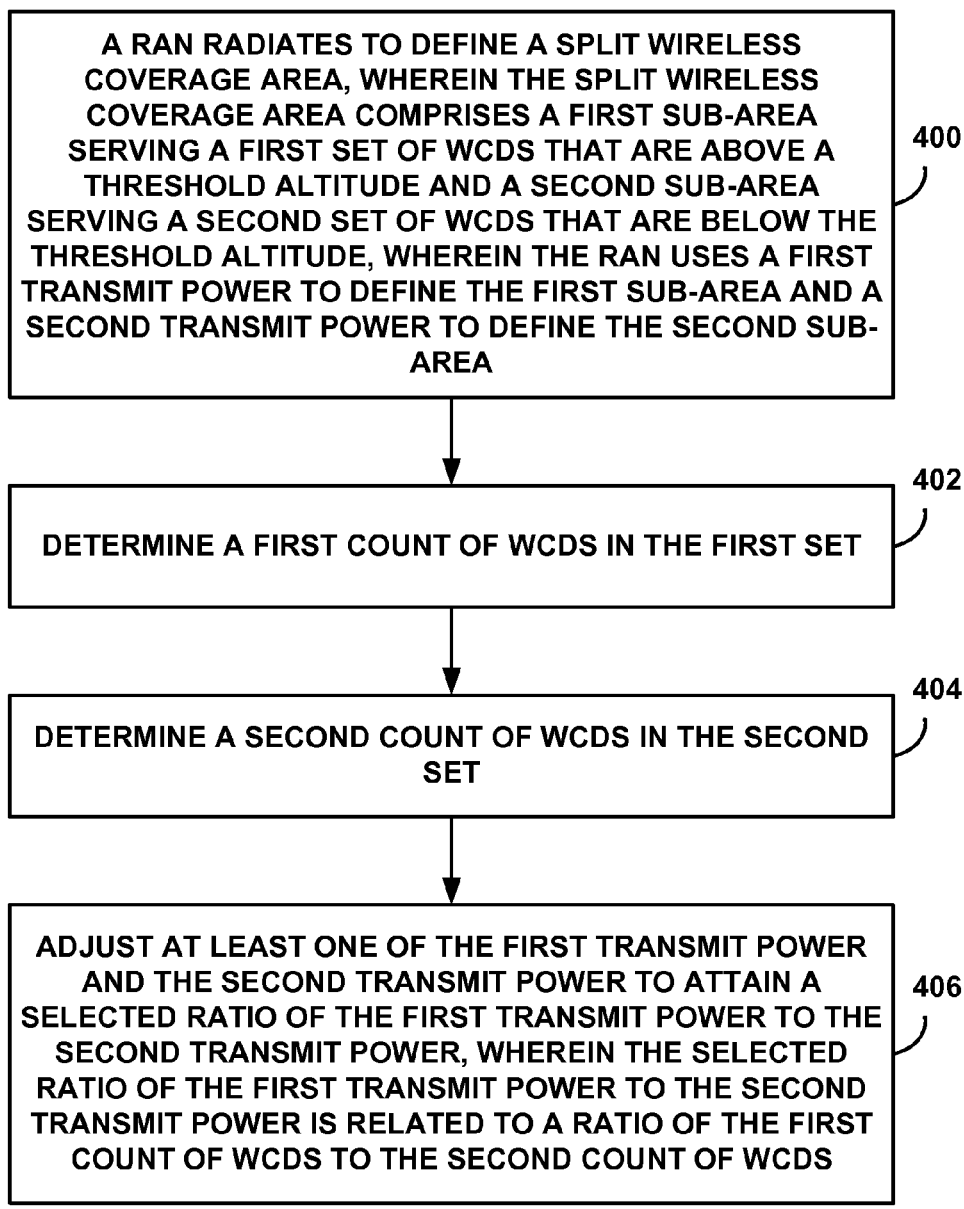
FIG. 4 is a flow chart, in accordance with an example embodiment.

FIG. 4 is a flow chart of an example method. One or more of the steps of FIG. 4 may be carried out by a RAN component or by a computing device that is not part of a RAN.

At step 400, a RAN may radiate to define a split wireless coverage area. The split wireless coverage area may include a first sub-area serving a first set of WCDs that are above a threshold altitude and a second sub-area serving a second set of WCDs that are below the threshold altitude. The RAN may use a first transmit power to define the first sub-area and a second transmit power to define the second sub-area. The RAN may also use one or more particular frequencies to define both the first sub-area and the second sub-area. Further, the first sub-area and the second sub-area may overlap geographically.

At step 402, a first count of WCDs in the first set may be determined. At step 404, a second count of WCDs in the second set may be determined. Determining the first count of WCDs in the first set may involve receiving a respective altitude report from each WCD served by the split wireless coverage area, and defining the first set to include any WCDs having reported altitudes above the threshold altitude. Determining the second count of WCDs in the second set may involve defining the second set to include any WCDs having reported altitudes below the threshold altitude.

Alternatively, the split coverage area may be defined by a BTS, and determining the first count of WCDs in the first set may involve receiving, from each WCD served by the split wireless coverage area, a respective signal strength report that reports the signal strengths of wireless coverage areas as measured by the respective WCD. Further, a group of the wireless coverage areas may be defined by one or more antennas that are more than a threshold distance from the BTS. Based on the received signal strength reports, the first set may be defined to include any WCDs that measured signal strengths above a threshold strength from at least n wireless coverage areas in the group.

Determining the second count of WCDs in the second set may involve, based on the received signal strength reports, defining the second set to include any WCDs that measured signal strengths above the threshold strength from at most m wireless coverage areas in the group, where m is less than n. In some embodiments, n may be less than five. In these and/or other embodiments, m may be one.

At step 406, the RAN may adjust at least one of the first transmit power and the second transmit power to attain a selected ratio of the first transmit power to the second transmit power. The selected ratio of the first transmit power to the second transmit power may be related to a ratio of the first count of WCDs to the second count of WCDs. For example, the selected ratio may be approximately proportional to the ratio of the first count of WCDs to the second count of WCDs. Adjusting at least one of the first transmit power and the second transmit power to attain the selected ratio of the first transmit power to the second transmit power may involve increasing the first transmit power and decreasing the second transmit power, or vice versa.

Figure 5:
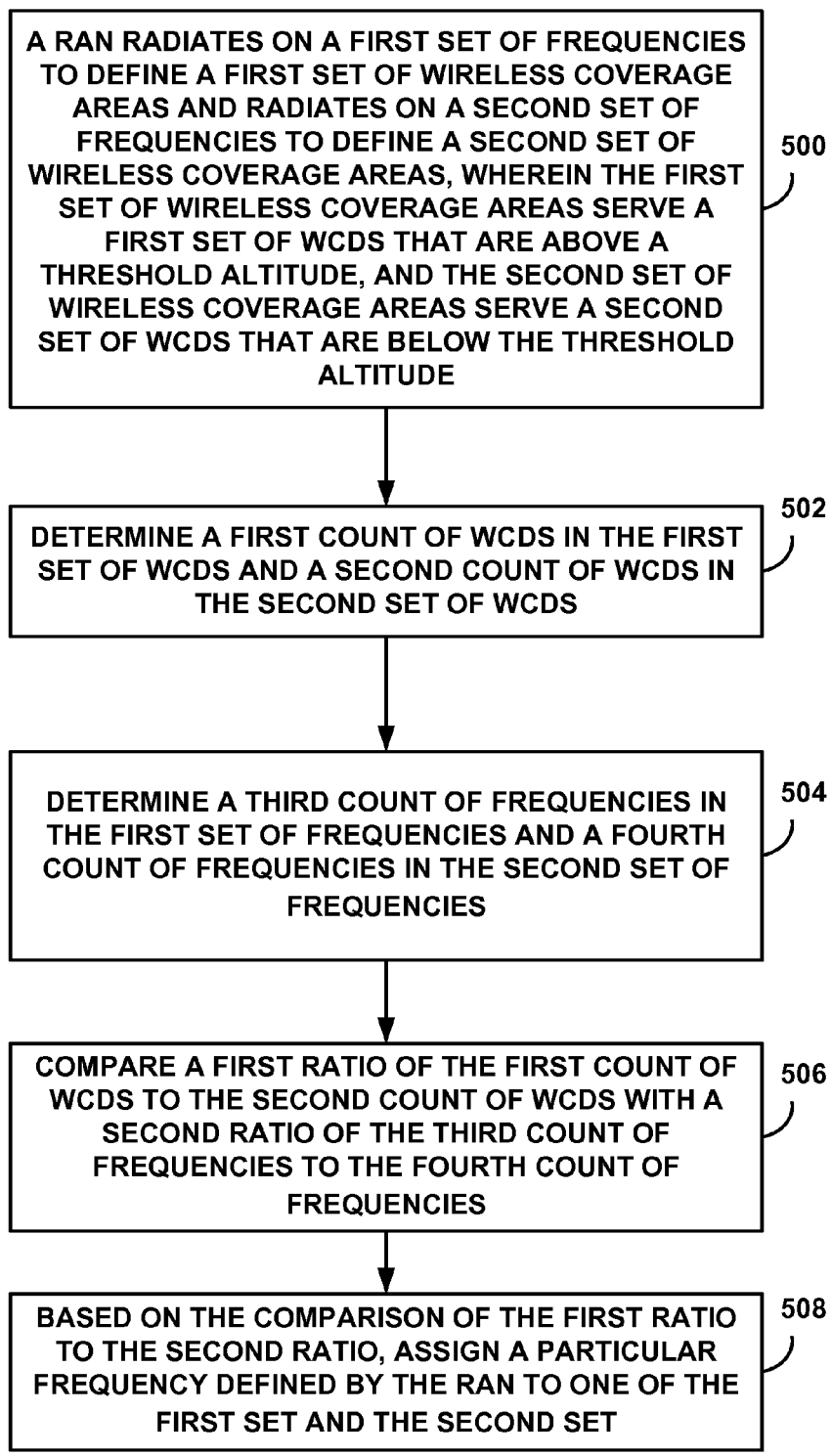
FIG. 5 is a flow chart, in accordance with another example embodiment.

FIG. 5 is a flow chart of another example method. Like the method of FIG. 4, one or more of the steps of FIG. 5 may be carried out by a RAN component or by a computing device that is not part of a RAN.

At step 500, a RAN may radiate on a first set of frequencies to define a first set of wireless coverage areas. The RAN may also radiate on a second set of frequencies to define a second set of wireless coverage areas. The first set of wireless coverage areas may serve a first set of WCDs that are above a threshold altitude, and the second set of wireless coverage areas may serve a second set of WCDs that are below the threshold altitude. There may be one or more wireless coverage areas in each set.

At step 502, a first count of WCDs in the first set of WCDs and a second count of WCDs in the second set of WCDs may be determined. At step 504, a third count of frequencies in the first set of frequencies and a fourth count of frequencies in the second set of frequencies may be determined. At step 506, a first ratio of the first count of WCDs to the second count of WCDs (e.g., a WCD ratio) may be compared with a second ratio of the third count of frequencies to the fourth count of frequencies (e.g., a frequency ratio).

At step 508, based on the comparison of the first ratio to the second ratio, a particular frequency defined by the RAN may be assigned to one of the first set and the second set. Assigning the particular frequency to one of the first set and the second set may involve assigning the particular frequency to the first set of frequencies if the first ratio is greater than the second ratio, and assigning the particular frequency to the second set of frequencies if the first ratio is less than or equal to the second ratio. Alternatively or additionally, assigning the particular frequency to one of the first set and the second set may involve removing the particular frequency from the second set, and assigning the particular frequency to the first set, or removing the particular frequency from the first set, and assigning the particular frequency to the second set.

It should be understood that FIGS. 4 and 5 depict non-limiting embodiments. Thus, more or fewer steps than shown in FIGS. 4 and 5 may be used without departing from the scope of the embodiments. Additionally, each of these steps may be repeated one or more times, or may be omitted altogether, and these steps may occur in a different order than shown in FIGS. 4 and 5. Further, the flow charts of these figures may be combined with one another, in whole or in part. For instance, any of the additional features discussed in the context of FIG. 4 may also be applied to FIG. 5.

A step or block in any figure herein representing a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of tangible, non-transitory computer-readable medium such as a storage device including computer memory, a disk or hard drive, or other storage media. Thus, the program code may be stored on and/or executed by, for example, computing device 200.

Additionally, any enumeration of elements, blocks, or steps in this specification or the claims is for purposes of clarity. Thus, such enumeration should not be interpreted to require or imply that these elements, block, or steps adhere to a particular arrangement or be carried out in a particular order.

VII. Conclusion

Example embodiments have been described above. Those skilled in the art will understand, however, that changes and modifications may be made to these embodiments without departing from the true scope and spirit of the invention, which is defined by the claims.

The invention claimed is:

1. A method comprising:
   a radio access network (RAN) radiating to define a split wireless coverage area, wherein the split wireless coverage area comprises a first sub-area serving a first set of wireless communication devices (WCDs) that are above a threshold altitude and a second sub-area serving a second set of WCDs that are below the threshold altitude, wherein the RAN uses a first transmit power to define the first sub-area and a second transmit power to define the second sub-area;
   determining a first count of WCDs in the first set;
   determining a second count of WCDs in the second set; and
   the RAN adjusting at least one of the first transmit power and the second transmit power to attain a selected ratio of the first transmit power to the second transmit power, wherein the selected ratio of the first transmit power to the second transmit power is related to a ratio of the first count of WCDs to the second count of WCDs.

2. The method of claim 1, wherein determining the first count of WCDs in the first set comprises:
   receiving a respective altitude report from each WCD served by the split wireless coverage area; and
   defining the first set to include any WCDs having reported altitudes above the threshold altitude.

3. The method of claim 2, wherein determining the second count of WCDs in the second set comprises:
   defining the second set to include any WCDs having reported altitudes below the threshold altitude.

4. The method of claim 1, wherein the split coverage area is defined by a base transceiver station (BTS), and wherein determining the first count of WCDs in the first set comprises:
   receiving, from each WCD served by the split wireless coverage area, a respective signal strength report that reports the signal strengths of wireless coverage areas as measured by the respective WCD, wherein a group of the wireless coverage areas are defined by one or more antennas that are more than a threshold distance from the BTS; and
   based on the received signal strength reports, defining the first set to include any WCDs that measured signal strengths above a threshold strength from at least n wireless coverage areas in the group.

5. The method of claim 4, wherein determining the second count of WCDs in the second set comprises:
   based on the received signal strength reports, defining the second set to include any WCDs that measured signal strengths above the threshold strength from at most m wireless coverage areas in the group, wherein m is less than n.

6. The method of claim 4, wherein n is less than five.

7. The method of claim 6, wherein m is one.

8. The method of claim 1, wherein the RAN uses one or more frequencies to define both the first sub-area and the second sub-area.

9. The method of claim 1, wherein the first sub-area and the second sub-area overlap geographically.

10. The method of claim 1, wherein adjusting at least one of the first transmit power and the second transmit power to attain the selected ratio of the first transmit power to the second transmit power comprises increasing the first transmit power and decreasing the second transmit power.

11. A method comprising:
a radio access network (RAN) radiating on a first set of frequencies to define a first set of wireless coverage areas and radiating on a second set of frequencies to define a second set of wireless coverage areas, wherein the first set of wireless coverage areas serve a first set of wireless communication devices (WCDs) that are above a threshold altitude, and the second set of wireless coverage areas serve a second set of WCDs that are below the threshold altitude;
determining a first count of WCDs in the first set of WCDs and a second count of WCDs in the second set of WCDs;
determining a third count of frequencies in the first set of frequencies and a fourth count of frequencies in the second set of frequencies;
comparing a first ratio of the first count of WCDs to the second count of WCDs with a second ratio of the third count of frequencies to the fourth count of frequencies; and
based on the comparison of the first ratio to the second ratio, assigning a particular frequency defined by the RAN to one of the first set and the second set.

12. The method of claim 11, wherein assigning the particular frequency to one of the first set and the second set comprises:
if the first ratio is greater than the second ratio, assigning the particular frequency to the first set of frequencies; and
if the first ratio is less than or equal to the second ratio, assigning the particular frequency the second set of frequencies.

13. The method of claim 11, wherein assigning the particular frequency to one of the first set and the second set comprises:
removing the particular frequency from the second set; and
assigning the particular frequency to the first set.

14. The method of claim 11, wherein assigning the particular frequency to one of the first set and the second set comprises:
removing the particular frequency from the first set; and
assigning the particular frequency to the second set.

15. A computing device configured to interact with a radio access network (RAN), wherein the RAN radiates to define a split wireless coverage area, wherein the split wireless coverage area includes a first sub-area serving a first set of wireless communication devices (WCDs) that are above a threshold altitude and a second sub-area serving a second set of WCDs that are below the threshold altitude, wherein the RAN uses a first transmit power to define the first sub-area and a second transmit power to define the second sub-area, the computing device comprising:
a processor;
data storage; and
program instructions, stored in the data storage that, upon execution by the processor, cause the computing device to (i) determine a first count of WCDs in the first set, (ii) determine a second count of WCDs in the second set, and (iii) instruct the RAN to adjust at least one of the first transmit power and the second transmit power to attain a selected ratio of the first transmit power to the second transmit power, wherein the selected ratio of the first transmit power to the second transmit power is related to a ratio of the first count of WCDs to the second count of WCDs.

16. The computing device of claim 15, wherein determining the first count of WCDs in the first set comprises:
receiving a respective altitude report from each WCD served by the split wireless coverage area; and
defining the first set to include any WCDs having reported altitudes above the threshold altitude.

17. The computing device of claim 16, wherein determining the second count of WCDs in the second set comprises:
defining the second set to include any WCDs having reported altitudes below the threshold altitude.

18. The computing device of claim 15, wherein the split coverage area is defined by a base transceiver station (BTS), and wherein determining the first count of WCDs in the first set comprises:
receiving, from each WCD served by the split wireless coverage area, a respective signal strength report that reports the signal strengths of wireless coverage areas as measured by the respective WCD, wherein a group of the wireless coverage areas are defined by one or more antennas that are more than a threshold distance from the BTS; and
based on the received signal strength reports, defining the first set to include any WCDs that measured signal strengths above a threshold strength from at least n wireless coverage areas in the group.

19. The computing device of claim 18, wherein determining the second count of WCDs in the second set comprises:
based on the received signal strength reports, defining the second set to include any WCDs that measured signal strengths above the threshold strength from at most m wireless coverage areas in the group, wherein m is less than n.

20. The computing device of claim 15, wherein instructing the RAN to adjust at least one of the first transmit power and the second transmit power to attain the selected ratio of the first transmit power to the second transmit power comprises instructing the RAN to increase the first transmit power and decrease the second transmit power.

* * * * *